Figure 1:
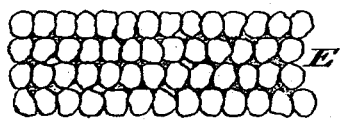
Figure 2:
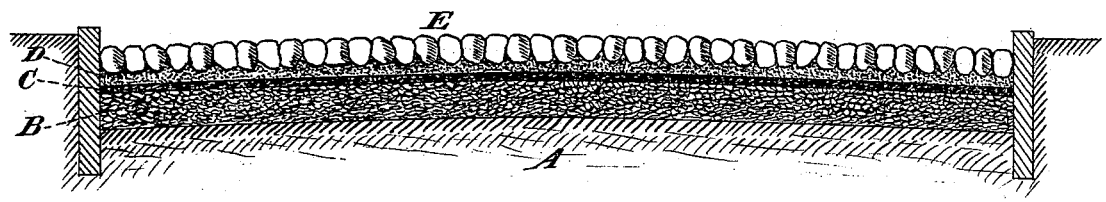

J. B. SPEED.
Pavements.

No. 211,942.　　　　Patented Feb. 4, 1879.

Witnesses.
A. Ruppert,
W. N. S———

J. B. Speed
Inventor.
D. S. Holloway & Co
Attorneys

UNITED STATES PATENT OFFICE.

JAMES B. SPEED, OF LOUISVILLE, KENTUCKY.

IMPROVEMENT IN PAVEMENTS.

Specification forming part of Letters Patent No. 211,942, dated February 4, 1879; application filed November 29, 1878.

*To all whom it may concern:*

Be it known that I, JAMES B. SPEED, of Louisville, in the county of Jefferson and State of Kentucky, have invented certain new and useful Improvements in Pavements; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention has for its object the construction of a pavement having a surface formed of bowlders or cobble-stones, the foundation of which is made of stone or gravel mixed with sufficient hydraulic cement to form a solid and impermeable bed of hydraulic concrete. Upon this is laid a stratum (about one inch in thickness) of coal-tar and sand, in equal proportions, for the purpose of giving elasticity to the pavement. Upon this is spread a stratum of purer hydraulic cement, into the upper surface of which the cobble-stones are embedded to about half their diameter while the cement is plastic.

In this class of pavements heretofore known the cobble-stones are laid in sand or gravel, from which they are liable to be detached, making holes in the pavement, or the cobble-stones are pressed down into the gravel or sand, leaving an irregular surface. In other cases blocks of stone have been laid on a concrete bed formed of various admixtures of tar, laid down and smoothed, the base of the stones resting on the bed, the interstices being filled with tar concrete or by hydraulic cement applied upon the surface of the pavement, which sometimes extend over the face. In other instances the bed is formed of concrete, of which tar forms a constituent element, for the purpose of giving an elasticity to the foundation for the cobble or other stones which are laid on this foundation, and then covered by a layer of concrete of similar constitution, which covers and embeds the stones, forming, when finished, a smooth surface. In other cases pieces of broken stone are rolled into the surface of a concrete bed, the surface of the pavement being formed in part of the stone and in part of the interstitial concrete. In other cases concrete and stone pavements have been built up by the application of a solution of lime with dry gravel or coal-ashes, and Rosendale or hydraulic cement mixed and sifted into the crevices of the broken stone, so that the broken stone shall interlock between the bed and each other with this concrete between them, and form a stone and concrete surface.

My invention is distinguished from all those previously known in this, that it is laid on a bed in which the bottom is made of a cheap yet impermeable mixture of stone and cement, overlaid by a stratum (about one inch thick) of coal-tar and sand, in equal proportions, for the purpose of giving elasticity to the pavement, and this is overlaid by a purer and stronger mortar of hydraulic cement, in which the stones are partly embedded before it sets, leaving the surface of cobble-stones without any surface covering. The upper stratum of concrete becomes with age as hard as the stone, and being firmly cemented to each bowlder or cobble-stone forms a solid and durable surface to the street.

In the annexed drawings, making part of this specification, Figure I is a plan view of the pavement. Fig. II is a vertical section.

The same letters indicate identical parts.

A is a road-bed properly graded to receive the pavement. B is the foundation, formed of stone or coarse gravel and sand mixed with hydraulic cement sufficient to unite the stones or gravel and sand, and thus make a compact and impermeable bed. This is spread evenly, smoothed, and compacted by ramming or rolling, and allowed to harden. On this is laid a stratum, C, about one inch thick, of coal-tar and sand, in equal proportions, for the purpose of giving elasticity to the pavement, designated by C in the drawings. On this is then laid a coating, D, (of, say, two or three inches in thickness,) of concrete, formed of fine gravel and sand mixed with a larger proportion of hydraulic cement, so as to form a plastic surface, in which, while soft, the cobble-stones E are embedded to about the middle of their diameter, and laid so as to form a uniform surface. Sand is then thrown on to fill the interstices.

What I claim as my invention, and desire to secure by Letters Patent, is—

Constructing a pavement with a solid foundation of concrete, an overlying stratum, C, of elastic material, and an upper stratum of concrete having cobble-stones embedded in its surface while plastic, and held in place so as to form the upper surface of the pavement, substantially as set forth.

In testimony that I claim the foregoing as my own I affix my signature in presence of two witnesses.

JAMES B. SPEED.

Witnesses:
W. N. SEVERANCE,
GEO. F. GRAHAM.